United States Patent [19]

Nobileau et al.

[11] 4,103,500
[45] Aug. 1, 1978

[54] APPARATUS FOR CONNECTING THE ENDS OF SUBMERGED PIPES

[75] Inventors: Philippe C. Nobileau, Neuilly sur Seine; Rene M. Dermy, Courcouronnes; Guy J. Fleury, Paris, all of France

[73] Assignees: Compagnie Francaise des Petroles, Societe Anonyme; Etudes Petrolieres Marines, Societe a Responsabilite Limitee, both of Paris; Ateliers et Chantiers de Bretagne-A.C.B., Societe Anonyme, Nantes; Compagnie Maritime d'Expertises, Societe Anonyme, Marseilles; Compagnie Generale pour les Developpements Operationnels des Richesses Sous-Marines (DORIS) Societe Anonyme, Paris; Societe Nationale Elf Aquitaine (Production), Courbevoie, all of France

[21] Appl. No.: 823,076

[22] Filed: Aug. 9, 1977

Related U.S. Application Data

[62] Division of Ser. No. 750,315, Dec. 14, 1976, Pat. No. 4,068,491.

[30] Foreign Application Priority Data

Dec. 19, 1975 [FR] France .............................. 75 38988

[51] Int. Cl.² .............................................. F16L 1/04
[52] U.S. Cl. .................................... 61/69 R; 61/107; 61/110
[58] Field of Search ............... 61/107, 110, 111, 69 R; 166/0.5, 0.6; 285/18, 24

[56] References Cited

U.S. PATENT DOCUMENTS 3,503,219 3/1970 Houot .................................. 61/110
4,004,635 1/1977 Marquaire et al. ............... 61/110 X Primary Examiner—Paul R. Gilliam
Assistant Examiner—David H. Corbin
Attorney, Agent, or Firm—Sughrue, Rothwell, Mion, Zinn and Macpeak

[57] ABSTRACT

The ends of submerged pipes are connected using a receiver provided with two apertures through which the pipe ends extend, the receiver being adapted to form a watertight enclosure with an intervention unit and housing means for closing the ends of the pipes comprising two stoppers bearing seal means to be applied against the inner walls of the pipe ends and being maintained spaced apart by a first boom, the receiver including means for supporting a sleeve to be connected to the ends of the pipes and a replacement boom located in the sleeve, the connection being performed by introducing the ends of the pipes to be connected into the receiver through the apertures, at least one of the pipe ends being introduced by movement of the receiver relative thereto, closing the ends of the pipes with the stoppers, causing an intervention unit to descend on to the receiver, providing a watertight enclosure therewith, removing the water from the enclosure and placing it under atmospheric pressure, placing the receiver under hydrostatic pressure, remotely controlling the sleeve supporting means to place the sleeve in position between the pipe ends and to simultaneously replace the first boom by the replacement boom, removing the water from the enclosure and again placing it under atmospheric pressure, connecting the ends of the sleeve to the pipe ends, placing the receiver under hydrostatic pressure and withdrawing the intervention unit.

8 Claims, 11 Drawing Figures

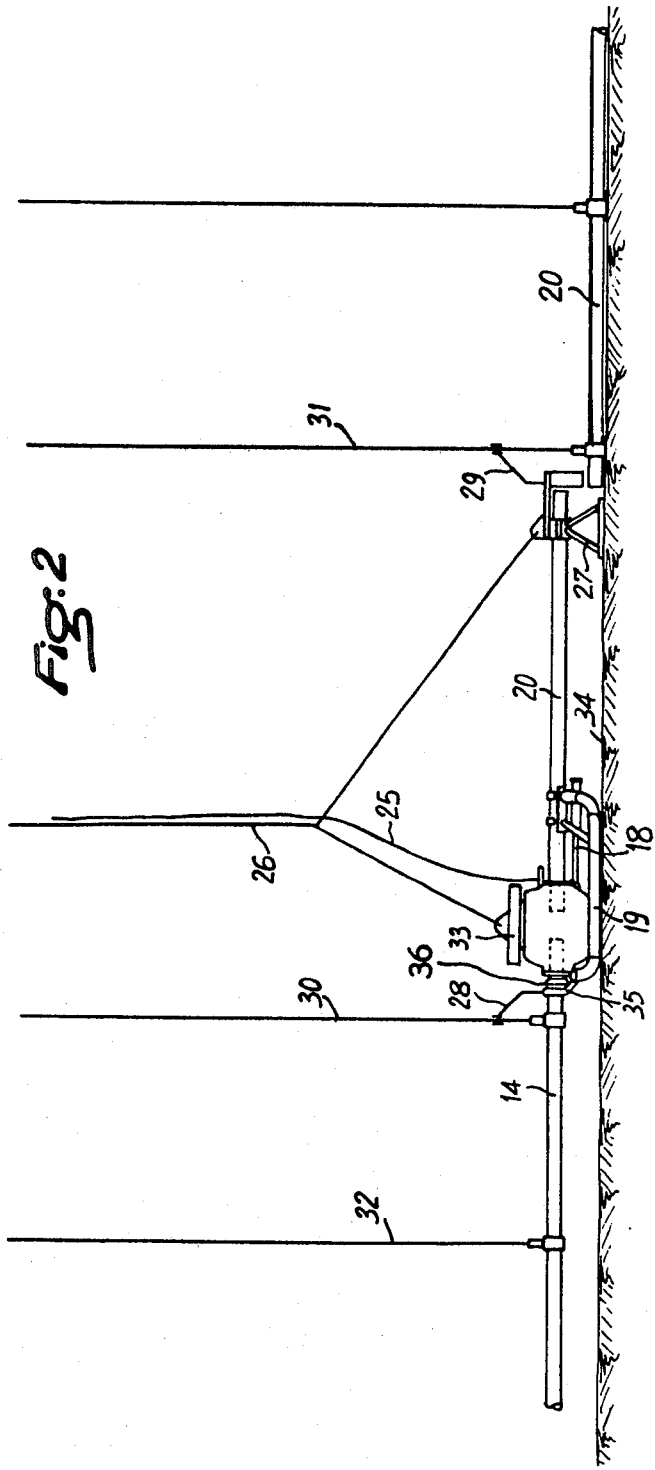
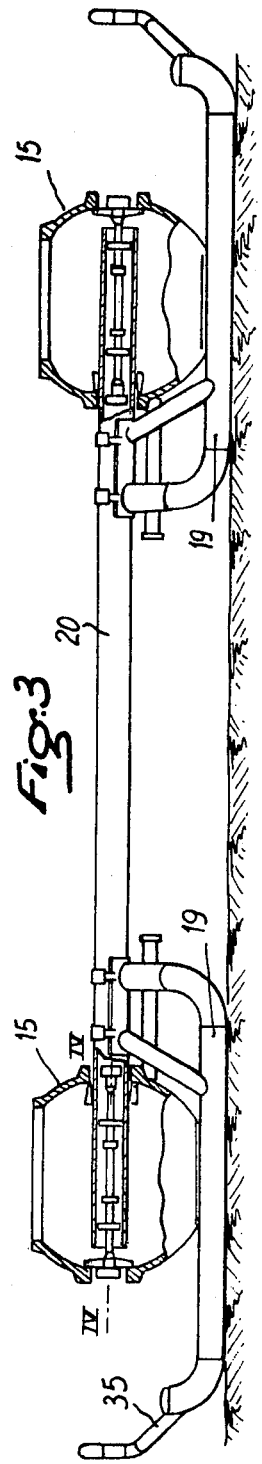

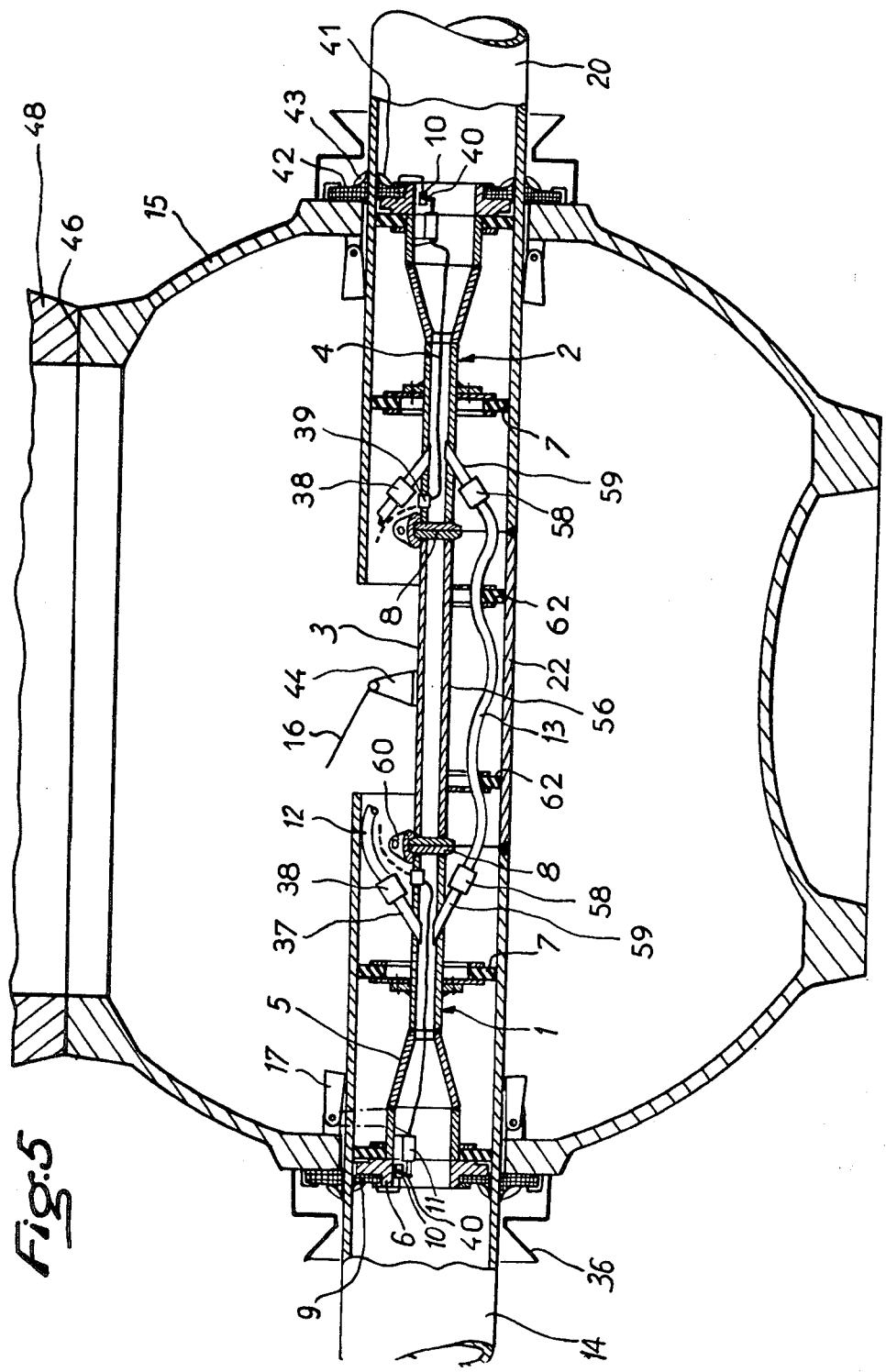

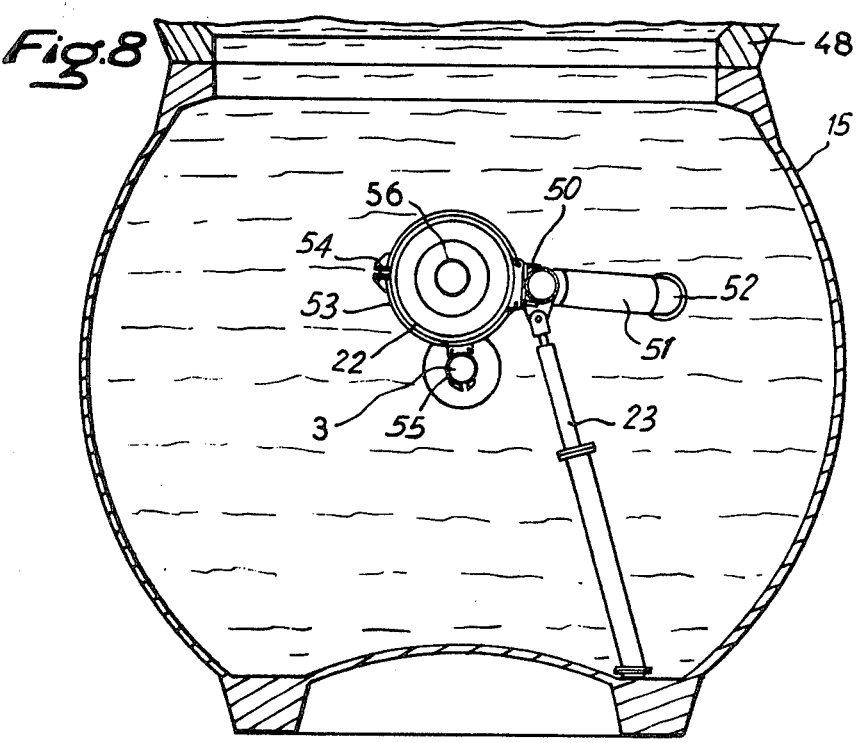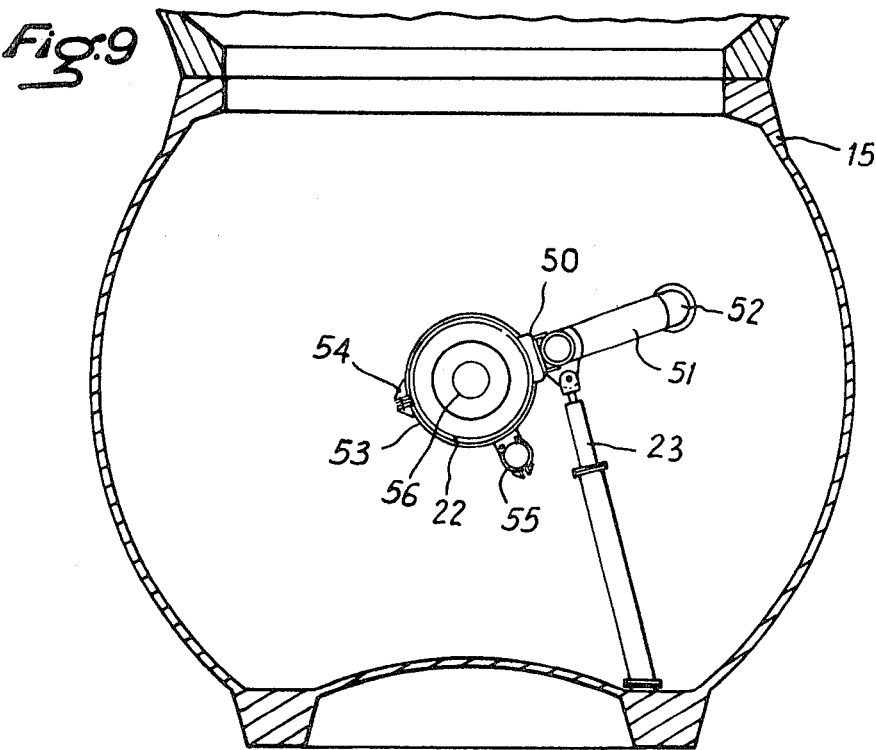

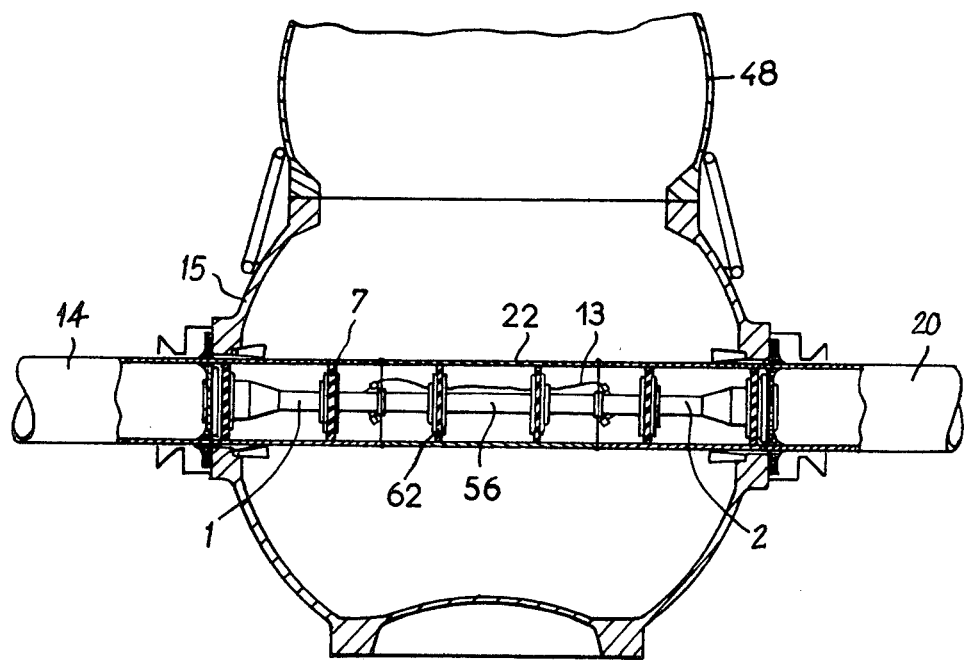
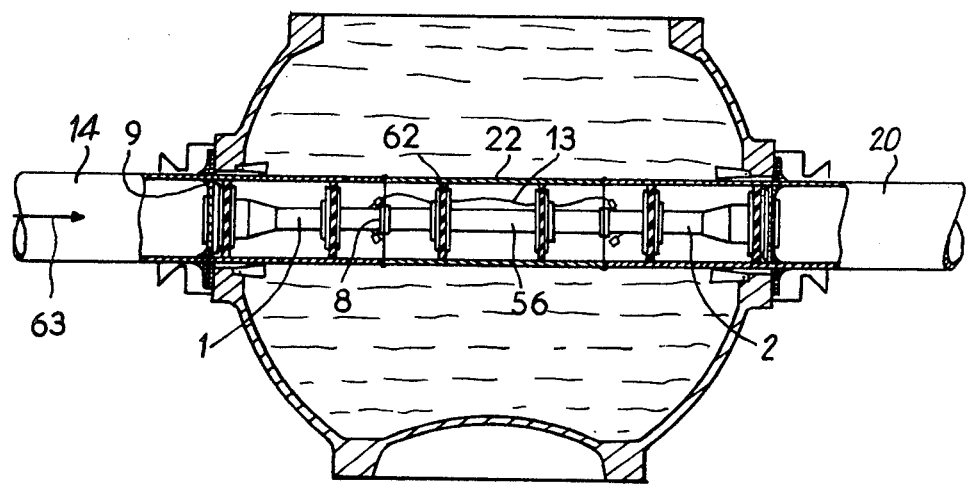

APPARATUS FOR CONNECTING THE ENDS OF SUBMERGED PIPES

This is a Division of application Ser. No. 750,315, filed Dec. 14, 1976, now U.S. Pat. No. 4,068,491 granted Jan. 17, 1978.

The invention relates to the connection of the submerged ends of pipes or sections of pipe by butting and welding a sleeve thereto.

The need for connecting sections of submerged pipes may occur particularly where it has become necessary to cut out a defective portion of an already submerged pipe, in order to substitute for it a new section, or where two portions of one and the same pipe line are being assembled and submerged simultaneously by means of two barges being guided towards one another and where the ends of the two submerged portions must be connected together.

One method already advocated for connection of pipe ends by means of a sleeve, lowered from the surface by means of an intervention unit, comprises, after having cut off the ends of the portions to be connected to provide a suitable length gap therebetween, aligning the cut pipe ends by means of an appliance known as an aligner. This appliance in addition enables the cut ends of the pipes to be introduced into corresponding apertures in a common receiver which is made watertight by capping it with an intervention unit and equipping each of the two apertures with suitable watertight seals. If each pipe end is in addition provided with a stopper, it is sufficient to let a crew of operators go down in the undersea intervention unit to proceed immediately with the connection, after having emptied the receiver of water and replaced the water with air at atmospheric pressure.

However, as soon as the depth at which connection is carried out increases, the forces exerted by the hydrostatic pressure rapidly become considerable and in order to ensure perfect safety of the intervention personnel, it is necessary to prevent any movement of the stoppers at the time the receiver is placed under atmospheric pressure. For this purpose booms are employed to keep the stoppers apart.

The personnel thus being safe from any risk of entry of water by insufficient blocking of movement of the stoppers during the whole time that the receiver is at atmospheric pressure, proceed with the introduction of the connecting sleeve between the ends of the pipes. This introduction, is, however, tricky because it necessarily involves movement of the originally installed booms. Hence it is arranged so that during the course of placing the sleeve in position only one boom is moved at a time. Besides these precautions, it is still necessary to ensure perfect putting in that the booms are placed in exactly the right positions, which increases the difficulty of connection without increasing the safety of the manoeuvre.

It is an object of the present invention to provide a method of connection of two pipe ends using a receiver which is rendered watertight and by means of a sleeve which is butted against the ends of the pipes introduced into the receiver and welded thereto by an intervention crew, wherein the introduction of the sleeve between the pipe ends is carried out while the receiver is under hydrostatic pressure.

Thus contrary to previous methods where at least one boom was necessary to ensure the stability of the stoppers during the whole of the operation of placing the sleeve in position it is possible by use of the present invention to withdraw any safety boom previously provided when the receiver was placed under atmospheric pressure and to substitute for it another boom after the sleeve has been placed in position and before atmospheric pressure in the receiver is restored to enable welding of the butted sleeve.

It is another object of the invention to facilitate restoration of the receiver to a condition of perfect safety by automatic substitution of a replacement boom for the original boom during introduction of the connecting sleeve between the pipe ends.

Such an operation is in fact made possible since the boom or booms are no longer subjected to the forces of compression resulting from the differences in pressure between the areas of the stoppers inside and outside the receiver as in the former method.

It is another object of the invention to provide a movable structure for putting the sleeve into position and for simultaneous substitution of a replacement boom inside the sleeve for the original boom external to the sleeve.

Thus a simple conventional remote control is sufficient to obtain, for example, by simple pivoting of a movable structure carrying the sleeve, and a replacement internal boom and connected to the external boom originally located between the two pipe stoppers, the placing in position of the sleeve between the pipe ends and the substitution of the replacement boom for the boom originally holding the stoppers spaced apart. The new boom is centred automatically between the two stoppers during the course of introduction of the sleeve between the ends of the pipes, so that atmospheric pressure may then be restored in the receiver with complete safety and the operation of welding proceeded with.

It is another object of the invention to ensure, from the first time the receiver is placed under atmospheric pressure, an even distribution of the pressures exerted on the faces of the stoppers by automatically placing the two pipe ends in communication upon putting the receiver into position.

Variations in temperature and pressure may therefore occur in one of the pipes without bringing about an increased thrust against the stopper of the other pipe by way of the boom.

It is another object of the invention to ensure maintenance of communication between the two pipe ends during the course of exchanging the booms and placing the sleeve in position so that it is sufficient to restore atmospheric pressure in the receiver to enable the operators to undertake any work immediately under conditions of safety have been established.

The invention will be more fully understood from the following description of an embodiment thereof, given by way of example only, with reference to the accompanying drawings.

In the drawings:

FIG. 2 is a diagrammatic representation similar to that of FIG. 1 after joining of the receiver onto one of the portions of pipe;

FIG. 3 is a section of pipe for substitution equipped with two receivers;

FIG. 5 is an overall view showing respectively the receiver in its top and bottom portions before and after welding of the connecting sleeve;

FIG. 8 is a diagrammatic view of the receiver partially in section along a plane perpendicular to the axis of the pipes after restoration of hydrostatic pressure in the receiver;

FIG. 9 is a diagrammatic view of the receiver similar to that of FIG. 8 after placing of the connection sleeve in position and restoration of atmospheric pressure;

FIG. 10 is a diagrammatic view of the receiver similar to that of FIG. 5 after welding of the sleeve, and FIG. 11 is a diagrammatic view of the receiver similar to that of FIG. 10 after return of the intervention unit to the surface.

Figure 1:
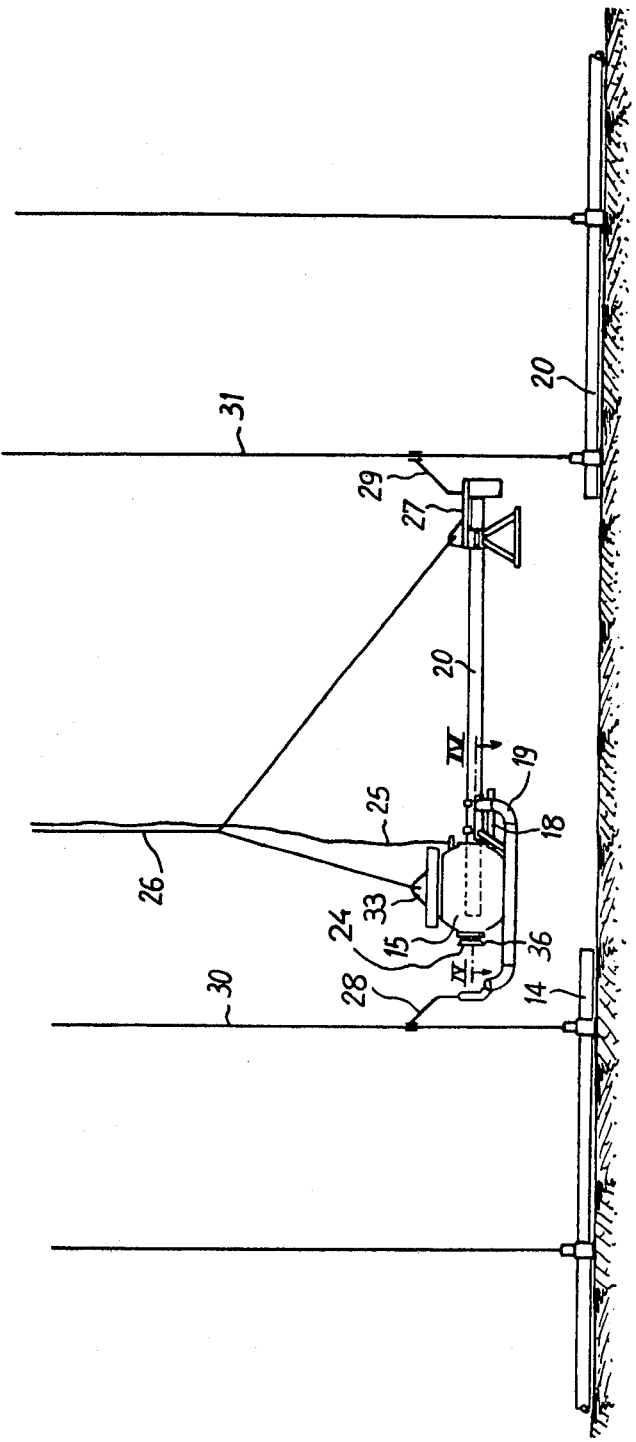
FIG. 1 is a diagrammatic representation in elevation of the lowering of a pipe section for replacement of a portion of a submerged pipe equipped with a receiver in accordance with the invention.

As the method of connection may be applied equally to the joining of the ends of two portions of one and the same pipe which is being assembled and which is being submerged by means of two barges being guided towards one another as to the joining of the ends of a section for replacement of a portion of a pipe already submerged, it will be observed that FIGS. 1 to 3 are intended to illustrate, for only one of the possible applications, the various structures for placing the receiver in position, as these structures may be of any kind. In particular an appliance known as an aligner may be employed for aligning the ends of the submerged pipes to be connected, for cutting off of these ends so as to obtain a predetermined gap between them and for introducing them into the appropriate apertures in the receiver for connection.

In the embodiment of FIG. 1, the receiver 15 is integral with a sledge 19 upon which it can move parallel with the axis of apertures 24 for receiving the pipes to be connected. This movement is effected by remote control of jack 18, effected from the surface by means of the general control cable 25, for example. In the example chosen, one of the apertures 24 is already provided with a section to be connected to the pipe 20 and which has also been designated 20 in order to remind one that the receiver 15 may equally well contain beforehand one of the ends of the pipes to be connected. The receiver 15 is connected by a carrier implement 33 to a cable 26 which also supports an apparatus 27 for positioning the free end of the section 20. Guide devices 28 and 29 enable one of the ends of the sledge 19 and of the section 20 to be lowered vertically straight down onto the ends of the pipes 14 and 20 by means of guide cables 30 and 31.

At the end of its descent the sledge 19 rests on the bottom or on a suitable flooring 34 as shown in FIG. 2. Manipulation of the supporting cable 32 and guide cable 30 enables the end of the pipe 14 to be brought facing the aperture 24. The pipe 14 is preferably guided laterally by the end 35 of the sledge 19, then by a guide cone 36 at the time of introduction of the end of the pipe 14 into the receiver 15 by movement of the receiver along the axis of alignment of the pipe 14 and the section 20.

It is clear that the receiver 15 may be an element isolated from any structure such as that represented, for example, in FIGS. 1 and 2 and may then be employed for completing the connection of the section 20 to the pipe 20. Instead of an isolated receiver an assembly of two receivers 15 may be employed, which are joined by means of the section 20 as shown in FIG. 3.

Figure 4:
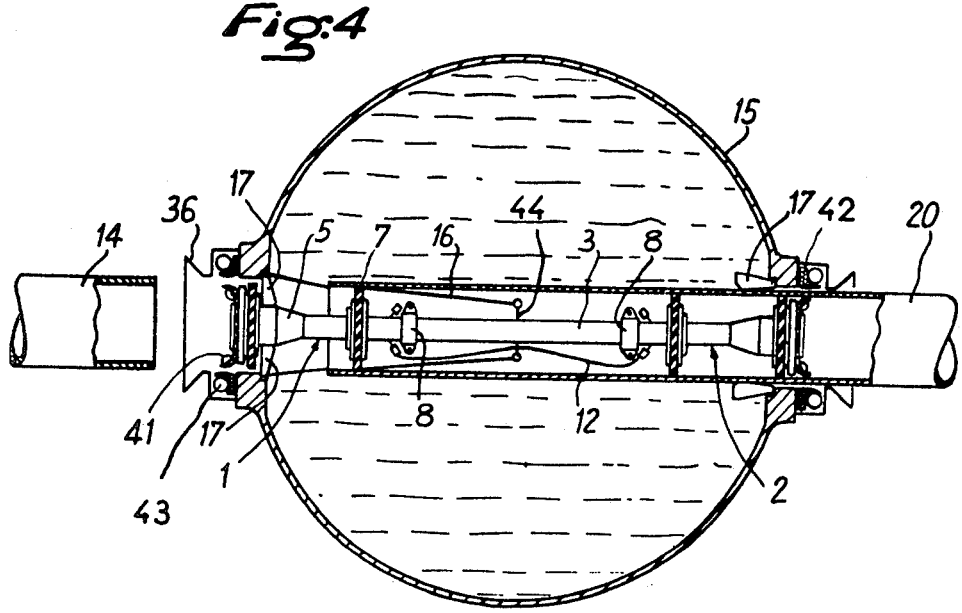
FIG. 4 is a diagrammatic view of the receiver of FIG. 3 partially in section along the line IV—IV in FIG. 3 before its joining onto one of the portions of pipe.

However, whatever the structure associated with the receiver itself, the latter includes as shown in FIGS. 4 and 5 a first boom 3 connected at each of its ends through flanges 8 and locking collars 60 to stoppers 1 and 2. For simplification of the drawing the assembly of the flange 8 and collar 60 has been designated 8 on Figures other than 5 and 11. The stoppers 1 and 2 prior to the entry of the pipes 14 and 20 are held by retractable catches 17 bearing against a central frame 5 forming a thruster for each stopper 1 and 2. The thrusters 5 formed of hollow tubes also carry scrapers 7 and a pipe stub 37 equipped with a quick-connector valve 38 for connection of flexible piping 12 to form a bypass for the boom 3. Bosses 39, FIG. 5, enable either electric cables 4 for the control of solenoid valves for the control of lip seals 9 mounted on plates 6 integral or fast with the thrusters 5, or hydraulic control channels 4 for jacks 11 which actuate valves 10 for the lip seals to pass through the thruster walls in a watertight manner. The remote controls are carried out preferably from the surface by means of the general remote-control cable 25 or from an intervention unit 45, FIG. 7. When the jack 11 is controlled in one direction it rocks the lever 40 controlling the valve 10 which has the effect of emptying the inflatable chambers 41, FIG. 4, of the lip seals 9, thus causing relaxing of the lips and their application against the inner wall of the pipe, e.g. pipe 14, facing them, as will be explained later.

The receiver 15 also comprises external lip seals 42 held apart by inflation of chambers 43.

Figure 6:
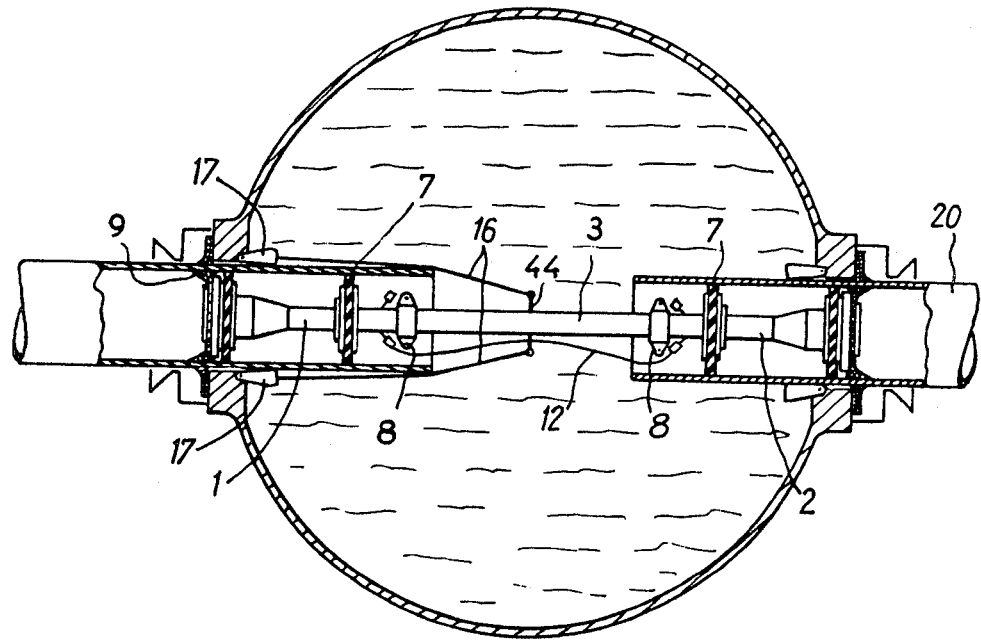
FIG. 6 is a diagrammatic view partially in horizontal section through the receiver immediately after its joining to the pipe.

When the receiver 15 is moved towards the pipe 14 by means, for example, of jack 18, FIG. 2, the end of the pipe 14, guided by the guide cone 36 is introduced between the lip seals 9 and 42 (FIGS. 4 and 5) and then caps the first scraper 7 before tilting the retractable catches 17 which, by moving aside, free the thruster 5 of the stopper 1. Continuing its movement the receiver 15 takes up a central position with respect to the ends of the pipes 14 and 20 (FIG. 6), cables 16 connecting the catches 17 to a locator member 44 being intended to keep the boom 3 in the centre of the receiver despite the thrust exerted by the pipe 14.

Figure 7:
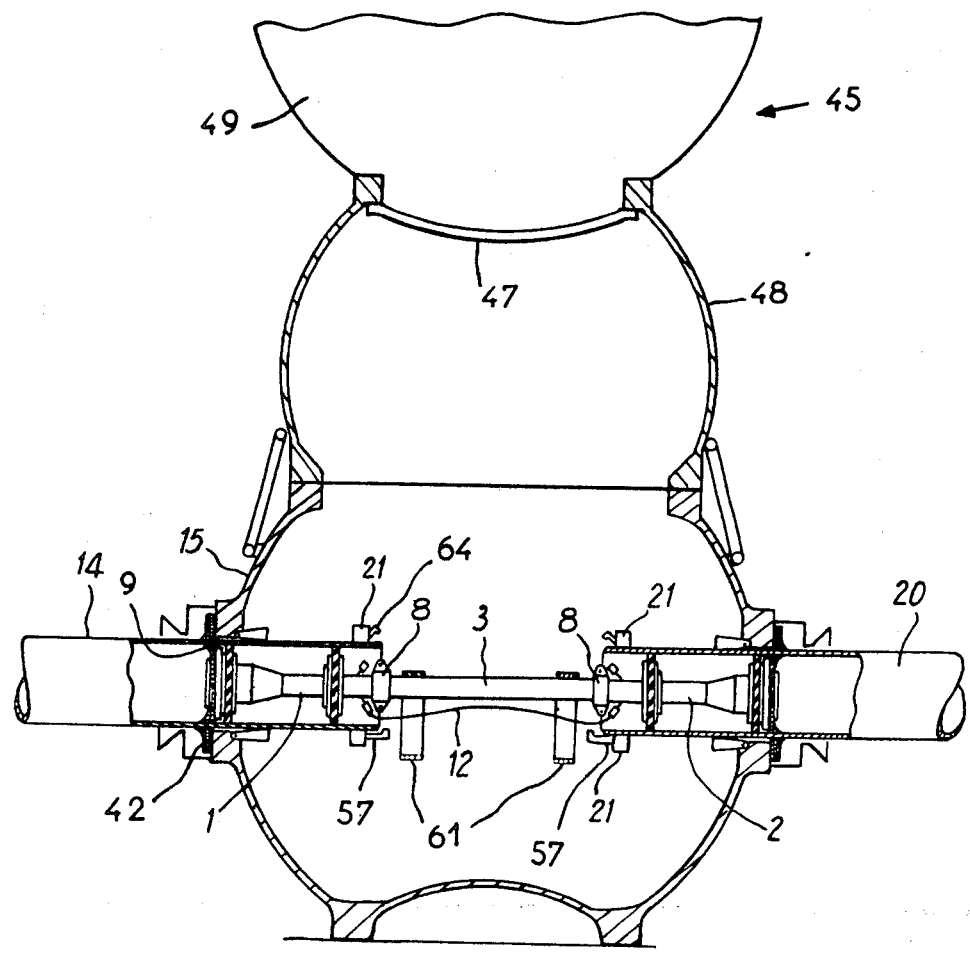
FIG. 7 is a diagrammatic view of the receiver after placing of the intervention unit and preparation of the ends of the portions of pipe to be connected.

From the surface, the deflation of the chambers 41 and 43 holding back the lips of the seals 9 and 42 is then caused and any suitable undersea intervention unit 45, FIG. 7, is let down onto the connection ring 46 of the receiver 15. The watertight door 47 of the unit 45 is maintained closed and the water contained in the receiver 15 and the skirt 48 of the unit 45 is depressurized and removed by means of a pump (not shown) controlled from the watertight chamber 49 of the intervention unit. The seals 9 and 42 applying themselves respectively against the inner and outer walls of the pipe 14 ensure the watertightness of the receiver 15 and the skirt 48 so that it is sufficient for the intervention crew to descend into the receiver which has been placed under atmospheric pressure in order to proceed with the connection of a sleeve 22, FIGS. 8 to 11, which may be lowered either with the receiver 15 or with the intervention unit and which is coupled to a support 50 on a guide structure 51 hinged on the receiver 15 at 52 and controlled by a jack 23. Attachment of the sleeve 22 may be obtained, for example, by means of collars 53 equipped with ears 54 which are joined by means of clamping nuts. Each collar 53 comprises in addition a smaller auxiliary collar 55 used to surround the boom 3. The hinge 52 is located so that during the course of the movement of the guide structure 51 under the effect of the jack 23 a boom 56 centred axially in the sleeve 22 takes up the position which the boom 3 had, the latter then taking up the position shown in FIG. 9.

Thus the intervention crew having removed the cables 16 and the attachment member 44 which has become unnecessary, mount the sleeve 22 in its collars 53 or, as the case may be, check the mounting of the sleeve 22 as well as the attachment where necessary of the collars 55 to the boom 3, FIG. 8. They proceed first of all to cut off of the ends of the pipes 14 and 20, if necessary, the crop ends from which have been represented diagrammatically by 61 in FIG. 7, so that the separation of the ends of the pipes to be connected is adjusted to the length of the sleeve 22. The crew then fixes round the pipe ends to be connected, collars 21 provided with lower fingers 57 extending parallel with the axis of the pipe and upper pivoting fingers 64 intended to facilitate positioning of the sleeve 22 with a view to its welding to the ends of the pipes 14 and 20.

Before putting the sleeve 22 in position the intervention crew connects the ends of flexible piping 13, FIG. 5, identical with the flexible piping 12 and passing through the sleeve 22, to the connections on valves 58 mounted on the pipe stubs 59 on the stoppers 1 and 2. Having opened the valves 58 and closed the valves 38, the flexible pipe 12 is withdrawn as well as the locking collars 60 of the flanges 8 of the stoppers 1 and 2 and the boom 3. This withdrawal involves no risk because of the heavy pressure exerted by the thrusters 5 of the stoppers 1 and 2 on the boom 3.

The replacement boom 56 is identical with the first boom 3 and is centred in the sleeve 22 by means of the scrapers 62. After the intervention crew has moved back into the chamber 49 of the unit 45 and the door 47 has been closed, the watertight receiver 15 is again flooded. The jack 23, FIGS. 8 and 9, is then operated in order to replace the first boom 3 by the boom 56 as the sleeve 22 comes to rest against the fingers 57.

That is, the boom 3 being no longer subjected to the high pressure exerted by the thrusters 5 of the stoppers 1 and 2 since the pressures exerted on the opposite faces of each stopper are again identical, the boom 3 may easily be removed by the collars 55 integral or fast with the support 50 moved by the jack 23. Hence it is sufficient that the centering of the new boom 56 inside the sleeve 22 is correctly obtained by means of the scrapers 62 for the flanges 8 of the thrusters 5 of the stoppers to again face the corresponding flanges of the boom 56. With the sleeve 22 automatically centred because of the movement defined by the pivot 52 of the support 50 and the positioning fingers 57, the receiver 15 may again be emptied without risk of movement of the stoppers 1 and 2. In short, the same conditions as previously again prevail, the boom 56 being compressed by the thrusters 5, and the pipe 13 preventing any difference in pressure across the stoppers 1 and 2 which could cause movement of the boom 56, thrusters 5 and stoppers 1, 2.

The intervention crew may therefore descend again into the receiver 15, proceed, by direct manipulation of the sleeve 22 and/or the fingers 57 and 64 or any other means, to accurately adjust the distances between chamfers on the ends of the pipes 14, 20 and the sleeve 22, and finally carry out the welding of the sleeve 22 to the pipes in complete safety. The intervention crew then returns to the unit 45 and, if necessary, controls by means of a remote control the reinflation of the chambers 41 for raising the lips of the lip seals 9. However, in view of the pressure balance between the faces of each stopper, it may be sufficient to apply at the end of the pipe 14, for example, a sufficient pressure indicated diagrammatically by the arrow 63 (FIG. 11) to bring about the discharge of the stoppers 1 and 2 and the boom 56 through the pipe 20. The boom 56 being no longer rigidly attached to the flanges 8 of the stoppers 1 and 2, the assembly can easily pass through cranked portions of the pipe 20, the possible inclination between the axes of the boom and the stoppers 1 and 2 not being restricted by the flexible piping 13.

Although in the foregoing only one embodiment has been described of apparatus for putting into effect the method of connection explained, it will be understood that numerous modifications in detail may be applied to the various means employed. Thus, for example, any structure may be employed which enables prior cutting off of the ends of the pipes 14 and 20 to avoid any cutting inside the receiver. Similarly the first boom 3 may be not attached to the support 50 for the sleeve 22 but fall by itself under the thrust of the latter.

Similarly watertight seals of any other type than lip seals having inflatable chambers for raising the lips may be employed.

What is claimed is:

1. Apparatus for connecting two ends of submerged pipes comprising a receiver having two aligned apertures through which the pipe ends extend, jack means for moving the receiver relative to one pipe end to assist in the introduction of the other pipe into said receiver, an undersea intervention unit detachably secured onto said receiver to define a watertight enclosure for an intervention crew for connecting the two ends of the pipes by means of a sleeve, first seal means between the outer surfaces of the pipes and the apertures in the receiver, a stopper having second seal means disposed within the end of each pipe, a first boom detachably connected to said stoppers for holding said stoppers apart, a sleeve having a length equal to the gap between the ends of the pipes, a replacement boom disposed inside said sleeve, and movable sleeve support means for placing the sleeve in position between the pipe ends under remote control for simultaneous replacement of the first boom by the replacement boom while the receiver is under hydrostatic pressure to balance the pressures being exerted upon the faces of the stoppers.

2. Apparatus as claimed in claim 1, wherein each stopper comprises a hollow central portion which forms a thruster equipped with at least one connector pipe stub.

3. Apparatus as claimed in claim 2, wherein each pipe stub is equipped with a valve.

4. Apparatus as claimed in claim 3, wherein each valve includes means for detachable connection to a flexible piping.

5. Apparatus as claimed in claim 2, wherein the hollow central portion of each stopper includes two pipe stubs each equipped with a valve, and the hollow central portion ends in a flange for attachment to a corresponding flange on a first boom for bearing against the stoppers.

6. Apparatus as claimed in claim 2, wherein said sleeve-support means is equipped with collars for attachment of the said sleeve, said replacement boom being centred in said sleeve by means of scrapers, the sleeve-support means carrying collar means for attachment to the first boom, the support means being mounted for pivotal movement for withdrawal of the first boom and the simultaneous placing in position the sleeve and the replacement boom, additional jack means for controlling the movement of the support.

7. Apparatus as claimed in claim 6, wherein the sleeve includes flexible piping equipped with two connectors for connection to the valves on the stoppers.

8. Apparatus as claimed in claim 2, wherein each stopper includes a first end scraper adjacent an inflatable-lip seal and a hollow conical structure connected to a hollow cylindrical portion bearing a second scraper and two pipe stubs for connection to two valves, the pipe stubs being located between the second scraper and a wall with a flange terminating the cylindrical portion.

* * * * *